United States Patent
Yang et al.

(10) Patent No.: US 10,045,353 B2
(45) Date of Patent: Aug. 7, 2018

(54) APPARATUS AND METHOD FOR CONFIGURING WIFI CHANNEL OF MOBILE DEVICE

(71) Applicant: HISENSE MOBILE COMMUNICATIONS TECHNOLOGY CO., LTD., Qingdao (CN)

(72) Inventors: Chuanqing Yang, Qingdao (CN); Shidong Shang, Qingdao (CN); Changsheng Zhou, Qingdao (CN); Zizhi Sun, Qingdao (CN); Bin Zheng, Qingdao (CN)

(73) Assignees: HISENSE MOBILE COMMUNICATIONS TECHNOLOGY CO., LTD., Qingdao (CN); HISENSE USA CORPORATION, Suwanee, GA (US); HISENSE INTERNATIONAL CO., LTD., Qingdao (CN)

( * ) Notice: Subject to any disclaimer, the term of this patent is extended or adjusted under 35 U.S.C. 154(b) by 97 days.

(21) Appl. No.: 15/064,824

(22) Filed: Mar. 9, 2016

(65) Prior Publication Data
US 2017/0094652 A1    Mar. 30, 2017

(30) Foreign Application Priority Data

Sep. 30, 2015   (CN) .......................... 2015 1 0645006

(51) Int. Cl.
*H04W 72/04*    (2009.01)
*H04W 8/24*    (2009.01)
*H04W 84/12*    (2009.01)

(52) U.S. Cl.
CPC ......... *H04W 72/048* (2013.01); *H04W 8/245* (2013.01); *H04W 84/12* (2013.01)

(58) Field of Classification Search
CPC .... H04W 72/048; H04W 8/245; H04W 84/12
See application file for complete search history.

(56) References Cited

U.S. PATENT DOCUMENTS

2006/0009219 A1    1/2006  Jaakkola et al.
2008/0198811 A1    8/2008  Deshpande et al.
(Continued)

FOREIGN PATENT DOCUMENTS

CN    101175283 A    5/2008
CN    101390344 A    3/2009
(Continued)

OTHER PUBLICATIONS

Office Action from Chinese Application No. 201510645006.9 dated Apr. 8, 2018 (8 pages).

*Primary Examiner* — Min Jung
(74) *Attorney, Agent, or Firm* — Harness, Dickey & Pierce, P.L.C.

(57) ABSTRACT

Embodiments of the application provide an apparatus and method for configuring a Wi-Fi channel of a mobile device, where the apparatus includes: a memory configured to store at least one instruction; and a processor configured to execute the instruction stored in the memory to perform: reading a mobile country code of a country or region in which the mobile device is located, if a Wi-Fi driver of the mobile device is loaded; inquiring about channel information corresponding to the mobile country code; and configuring Wi-Fi of the mobile device according to the channel information.

6 Claims, 2 Drawing Sheets

(56) References Cited

U.S. PATENT DOCUMENTS

| | | | |
|---|---|---|---|
| 2008/0259882 A1* | 10/2008 | Abdel-Kader | H04W 48/16 370/338 |
| 2013/0281085 A1* | 10/2013 | Sen | H04W 48/18 455/426.1 |
| 2014/0099916 A1* | 4/2014 | Mallikarjunan | H04W 8/20 455/406 |
| 2015/0103814 A1* | 4/2015 | Wang | H04W 8/183 370/338 |
| 2015/0142868 A1* | 5/2015 | Liu | H04L 51/20 709/202 |
| 2016/0014824 A1* | 1/2016 | Xiang | H04W 16/10 370/329 |
| 2016/0105843 A1* | 4/2016 | Xue | H04W 48/18 455/426.1 |

FOREIGN PATENT DOCUMENTS

| | | |
|---|---|---|
| CN | 102364969 A | 2/2012 |
| CN | 102685718 A | 9/2012 |
| CN | 103906272 A | 7/2014 |
| CN | 104427507 A | 3/2015 |

* cited by examiner

APPARATUS AND METHOD FOR CONFIGURING WIFI CHANNEL OF MOBILE DEVICE

CROSS-REFERENCE TO RELATED APPLICATION

This application claims the benefit and priority of Chinese Patent Application No. 201510645006.9 filed Sep. 30, 2015. The entire disclosure of the above application is incorporated herein by reference.

FIELD

The present disclosure relates to the field of communications and particularly to a method and apparatus for configuring a WIFI channel of a mobile device.

BACKGROUND

This section provides background information related to the present disclosure which is not necessarily prior art.

With the development of living level, Wireless Fidelity (Wi-Fi) has been widely applied to the various aspects of our life due to convenience and expeditiousness of wireless communication.

Opening of Wi-Fi channels is generally regulated in different countries or regions, so before mobile devices leave factory, the products are configured fixedly for countries or regions in which they are intended to operate, where some channels are opened or closed fixedly, and the different channels are scanned to determine whether the Wi-Fi channels of the products are regulated as required.

SUMMARY

This section provides a general summary of the disclosure, and is not a comprehensive disclosure of its full scope or all of its features.

An embodiment of the application discloses an apparatus for configuring a Wi-Fi channel of a mobile device, the apparatus including:

a memory configured to store at least one instruction; and
a processor configured to perform the instruction stored in the memory to perform:
reading a mobile country code of a country or region in which the mobile device is located, if a Wi-Fi driver of the mobile device is loaded;
inquiring about channel information corresponding to the mobile country code; and
configuring Wi-Fi of the mobile device according to the channel information.

An embodiment of the application further discloses an apparatus for configuring a Wi-Fi channel of a mobile device, the apparatus including:

a mobile country code reading module configured to read a mobile country code of a country or region in which the mobile device is located, if a Wi-Fi driver of the mobile device is loaded;

a channel information inquiring module configured to inquire about channel information corresponding to the mobile country code; and a channel configuring module configured to configure Wi-Fi of the mobile device according to the channel information.

An embodiment of the application further discloses a method for configuring a Wi-Fi channel of a mobile device, the method including:

reading a mobile country code of a country or region in which the mobile device is located, if a Wi-Fi driver of the mobile device is loaded;

inquiring about channel information corresponding to the mobile country code; and configuring Wi-Fi of the mobile device according to the channel information.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 1:
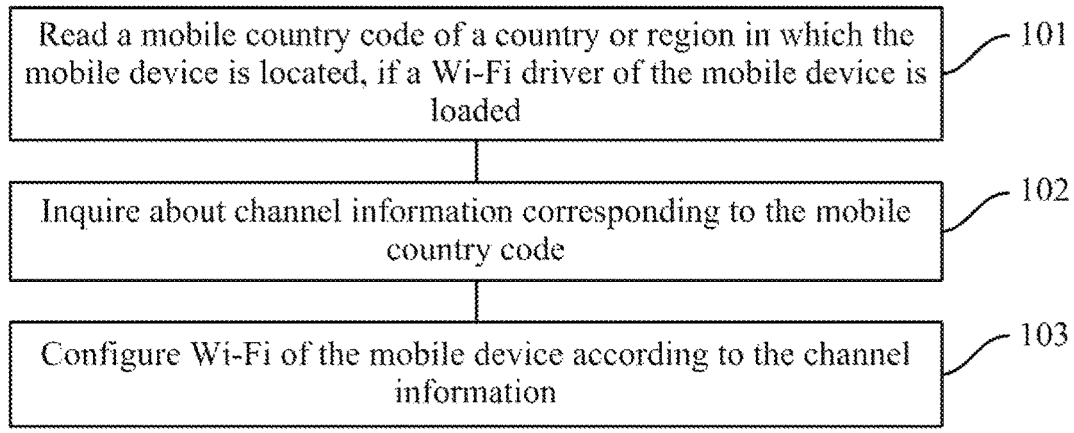
FIG. 1 is a flow chart of a process of a method for configuring a Wi-Fi channel of a mobile device according to an embodiment of the application.

Referring to FIG. 1, there is illustrated a flow chart of steps in a method for configuring a Wi-Fi channel of a mobile device according to an embodiment of the application, where the method can include the following steps:

The step 101 is to read a mobile country code of a country or region in which the mobile device is located, if a Wi-Fi driver of the mobile device is loaded;

It shall be noted that the embodiment of the application can be applicable to an operating system of the mobile device, e.g., a cell phone, a tablet computer, a smart wearable device (e.g., a smart watch), etc.

These mobile devices generally support Windows Phone, Android, IOS, Windows, and other operating systems, and typically can be connected with the wireless Access Point (AP), e.g., a router, through Wi-Fi.

In an application of the embodiment of the application, if a Wi-Fi function of the mobile device is enabled, for example, if a shortcut icon of a Wireless Local Area Network (WLAN) is clicked on by a user, then a Mobile Country Code (MCC) of a country or region in which a Subscriber Identity Module (SIM) card in the mobile device is registered is obtained via the gsm.operator.numeric interface in wifi.c at the Hardware Abstraction Layer (HAL).

Resources of the MCC are allocated and administrated centrally by the International Telecommunication Union (ITU), and a home country or region of a mobile subscriber is identified uniquely with three-digit MMC, as exemplified below:

| Country and region | Mobile Country Code (MCC) | Abbreviation |
|---|---|---|
| China | 460 | CN |
| Singapore | 525 | SG |
| Malaysia | 502 | MY |
| Thailand | 520 | TH |
| Hongkong | 454 | HK |
| Macao | 455 | MO |
| Taiwan | 466 | TW |
| U.S.A. | 310 | US |
| U.K. | 234 | UK |
| France | 208 | FR |

If the mobile country code is obtained, then the mobile country code can be written into a specified file, e.g., /data/misc/Wi-Fi/Wi-Fi_mcc.bin.

If the Wi-Fi driver is loaded, then the mobile country code of the country or region where the mobile device is located, which is obtained as a result of the inquiry if the Wi-Fi function is enabled can be read in the specified file, e.g., /data/misc/Wi-Fi/Wi-Fi_mcc.bin.

The step 102 is to inquire about channel information corresponding to the mobile country code.

In an embodiment of the application, the channel information is not fixed but loaded dynamically according to the country or region where the mobile device is located.

In an embodiment of the application, the step 102 can include the following sub-steps:

The sub-step S11 is to determine whether the mobile country code is valid if the mobile country code is read, and if so, to proceed to the sub-step S12; otherwise, to proceed to the sub-step S14;

In an implementation, the mobile country code can be matched against a preset country search table, and if the mobile country code is matched successfully, then it will be determined as being valid; otherwise, it will be determined as being invalid.

Here the country search table records therein valid mobile country codes, and the mobile device supports setting of a Wi-Fi channel corresponding to the mobile country code.

The sub-step S12 is to search for a category of the country or region to which the mobile country code belongs; and The sub-step S13 is to extract the channel information corresponding to the category;

The Wireless Local Area Network (WLAN) like radio, wireless TV, mobile communication in our daily life operates with a carrier of radio frequencies which are electromagnetic waves at frequencies ranging from 3 MHz to approximately 300 GHz, also referred to as radio frequency electric waves or radio waves. Also a radio spectrum defined for this band of electromagnetic waves is divided as per frequency range into extremely low frequencies, ultra low frequencies, intermediate frequencies, high frequencies, ultra-high frequencies, etc, where the WLAN operates in the range of radio frequencies including the 2.4 GHz band (2.4 GHz to 2.4835 GHz) and the 5 GHz band (ranging in frequency from 5.150 GHz to 5.350 GHz and 5.725 GHz to 5.850 GHz).

For the sake of universality, channels in the 2.4G band in different countries or regions are categorized into at least one of the following categories according to channel regulations, particularly 2.4G channel regulations, in the countries or regions:

A first category, a second category, and a third category;

Here channels corresponding to the first category include channels 1 to 13, which relate to 10 countries or regions in total, represented by P. R. China;

Channels corresponding to the second category include channels 1 to 11, which relate to 91 countries or regions in total, represented U.S.A.; and Channels corresponding to the third category include channels 1 to 14, which relate to one country of Japan.

Of course, the categories of channels above are only illustrative, and in an embodiment of the application, the channels can be categorized otherwise as required in reality, for example, the channels in the 5G band are categorized, etc., although the embodiment of the application will not be limited thereto. Moreover in addition to the categories of channels above, those skilled in the art can further categorize the channels otherwise as required in reality, although the embodiment of the application will not be limited thereto.

The sub-step S14 is to extract preset channel information.

If the mobile device is shipped to another country or region than a destination to which the product is exported, then there will be a limit support of the Wi-Fi channel, so the mobile country code of the country or region where the mobile device is located will be invalid.

Alternatively the mobile country code is read in error and changed to another code, so it cannot be recognized and is determined as an invalid mobile country code.

In these cases, a preset channels can be applied, e.g., the channels 1 to 11, so that Wi-Fi will be substantially available.

The step 103 is to configure Wi-Fi of the mobile device according to the channel information.

The propagation of a radio signal may be affected by its surrounding environment, so that the radio signal may be attenuated complicatedly in different directions due to multi-path and other problems, so the WLAN tends to be deployed by planning the network carefully.

Even if the wireless network is deployed successfully, it will be necessary to adjust parameters of the wireless network in use because the radio environment is constantly changing, and the propagation of the radio signal may be interfered with by a moving obstacle, an operating microwave oven, etc.

Thus the channels, transmit power, and other radio frequency resources shall be adjusted dynamically to accommodate the change of environment of the user.

The channel is configured as follows: if the SIM card is registered in a Chinese network, then the country where the cell phone is located will belong to the first category, and the country code of CN will be set into the 1d70h:5-6 byte of WCNSS_qcom_wlan_nv.bin, and after the file WCNSS_qcom_wlan_nv.bin is converted into an XML file, it will be configured in details as follows:

```
<CountryCode>
<Value>67</Value>
<Value>78</Value>
<Value>73</Value>
</CountryCode>
```

Here 67 and 68 are ASCII codes of C and N.

At this time the region in which CN is located is the Asia-Pacific, so the Regulatory Domain is set to APAC, and a list of channels under APAC is configured in the file WCNSS_qcom_wlan_nv.bin and converted into a list of readable files relating to configuring channel frequencies, power thresholds, power gains, and other channel information.

In an embodiment of the application, the Wi-Fi channel can be configured automatically according to the automatically obtained channel information.

In the embodiment of the application, the mobile country code of the country or region where the mobile device is located can be read, the channel information corresponding to the mobile country code can be loaded dynamically, and Wi-Fi can be configured, to thereby avoid some channel from being scanned unnecessarily or some necessary channel from being skipped so as to guarantee the success ratio of network connections; and also the channel information can be loaded dynamically to thereby alleviate developers and testers from a development and test effort while the channel information is being updated, so as to reduce a waste of labors and lower an error probability.

It shall be noted that for the sake of a concise description, the embodiments of the method have been described as a series of actions in combination, but those skilled in the art shall appreciate that the embodiment of the application will not be limited to the described order of the actions because some of the steps may be performed in another order or concurrently according to the embodiments of the application. Secondly those skilled in the art shall also appreciate that all the embodiments described here are preferred embodiments, but all the actions involved in the embodiments may not be necessary to the embodiments of the application.

Figure 2:
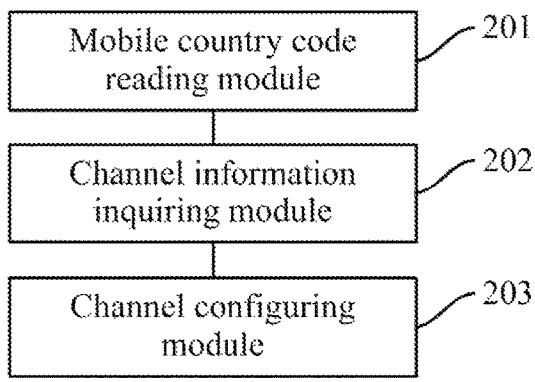
FIG. 2 is a structural block diagram of an apparatus for configuring a Wi-Fi channel of a mobile device according to an embodiment of the application.

Referring to FIG. 2, there is illustrated a structural block diagram of an apparatus for configuring a Wi-Fi channel of a mobile device according to an embodiment of the application, which can include the following modules:

A mobile country code reading module 201 is configured to read a mobile country code of a country or region in which the mobile device is located, if a Wi-Fi driver of the mobile device is loaded;

A channel information inquiring module 202 is configured to inquire about channel information corresponding to the mobile country code; and A channel configuring module 203 is configured to configure Wi-Fi of the mobile device according to the channel information.

In an embodiment of the application, the apparatus can further include the following modules:

A mobile country code obtaining module is configured to obtain the mobile country code of the country or region in which an SIM card in the mobile device is registered, if the Wi-Fi function of the mobile device is enabled; and A mobile country code writing module is configured to write the mobile country code into a specified file.

In an embodiment of the application, the mobile country code reading module 201 can include the following sub-module:

A file reading sub-module is configured to read in the specified file the mobile country code of the country or region where the mobile device is located, which is obtained as a result of the inquiry if the Wi-Fi function is enabled.

In an embodiment of the application, the channel information inquiring module 202 can include the following sub-module:

A validity determining sub-module is configured to determine whether the mobile country code is valid if the mobile country code is read, and if so, to invoke a category searching sub-module; otherwise, to invoke a preset channel information extracting sub-module;

The category searching sub-module is configured to search for a category of the country or region to which the mobile country code belongs;

A category channel information extracting sub-module is configured to extract the channel information corresponding to the category; and The preset channel information extracting sub-module is configured to extract preset channel information.

In an embodiment of the application, the validity determining sub-module can include the following units:

A search table matching unit is configured to match the mobile country code against a preset country search table in which valid mobile country codes are recorded;

A validity determining unit is configured to determine the mobile country code as being valid, if the mobile country code is matched successfully; and An invalidity determining unit is configured to determine the mobile country code as being invalid, if the mobile country code is matched unsuccessfully.

The categories include at least one of:

A first category, a second category, and a third category;

Here channels corresponding to the first category include channels 1 to 13;

Channels corresponding to the second category include channels 1 to 11; and

Channels corresponding to the third category include channels 1 to 14.

Preset channels include channel 1 to 11.

Figure 3:
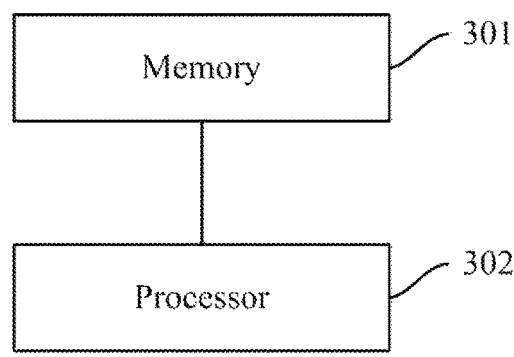
FIG. 3 is another structural block diagram of an apparatus for configuring a Wi-Fi channel of a mobile device according to an embodiment of the application.

Referring to FIG. 3, there is illustrated another structural block diagram of an apparatus for configuring a Wi-Fi channel of a mobile device according to an embodiment of the application, which can include:

A memory 301 is configured to store at least one instruction; and

A processor 302 is configured to execute the instruction stored in the memory 301 to perform:

reading a mobile country code of a country or region in which the mobile device is located, if a Wi-Fi driver of the mobile device is loaded;

inquiring about channel information corresponding to the mobile country code; and configuring Wi-Fi of the mobile device according to the channel information.

The processor 302 is further configured to execute the instruction stored in the memory 301 to perform:

Before the step of reading the mobile country code of the country or region in which the mobile device is located, if the Wi-Fi driver of the mobile device is loaded, obtaining the mobile country code of the country or region in which an SIM card in the mobile device is registered, if the Wi-Fi function of the mobile device is enabled; and writing the mobile country code into a specified file.

The processor 302 is further configured to execute the instruction stored in the memory 301 to perform:

reading in the specified file the mobile country code of the country or region where the mobile device is located, which is obtained as a result of the inquiry if the Wi-Fi function is enabled.

The processor 302 is further configured to execute the instruction stored in the memory 301 to perform:

determining whether the mobile country code is valid if the mobile country code is read; and If so, searching for a category of the country or region to which the mobile country code belongs, and extracting the channel information corresponding to the category;

Otherwise, extracting preset channel information

The processor 302 is further configured to execute the instruction stored in the memory 301 to perform:

matching the mobile country code against a preset country search table in which valid mobile country codes are recorded; and determining the mobile country code as being valid, if the mobile country code is matched successfully, and determining the mobile country code as being invalid, if the mobile country code is matched unsuccessfully.

Figure 4:
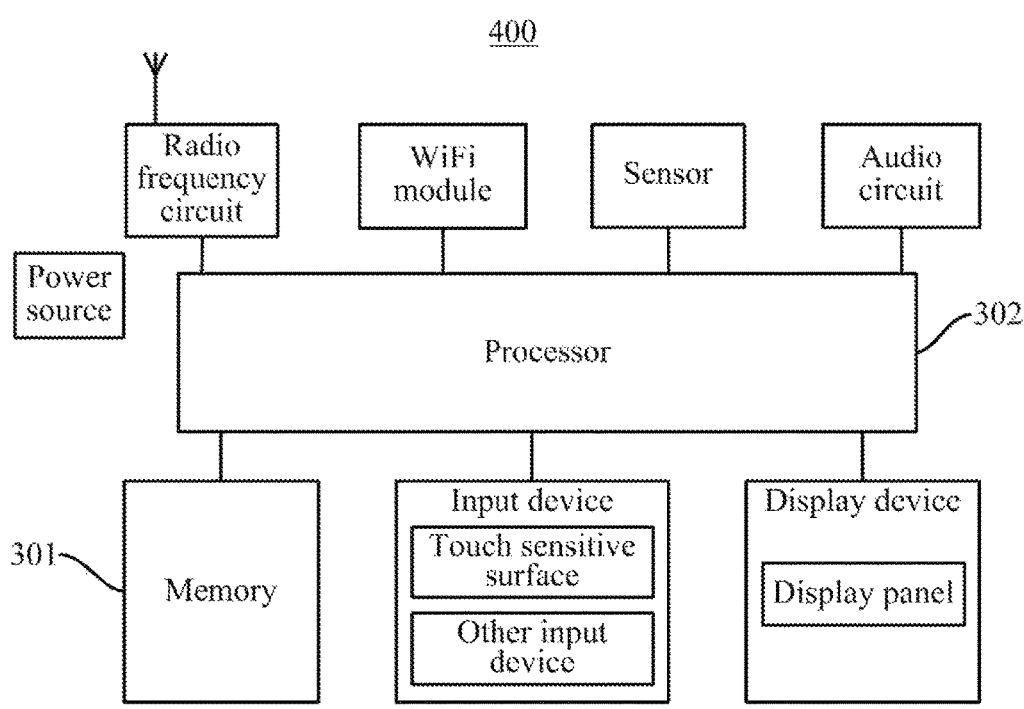
FIG. 4 is a structural block diagram of an apparatus for configuring a Wi-Fi channel of a mobile device according to an embodiment of the application.

As illustrated in FIG. 4, there is illustrated a structural block diagram of an apparatus for configuring a Wi-Fi channel of a mobile device according to an embodiment of the application. The configuring apparatus can be the mobile device per se. The mobile device 400 can be any one of various handheld devices (e.g., a cell phone, a tablet computer, a PDA, etc.), and can include a processor 302 including one or more processing cores, a radio frequency circuit, a memory 301 including one or more computer readable storage mediums, an input device, a display device, a sensor, an audio circuit, a Wi-Fi module, a power source, and other components. Those skilled in the art can appreciate that the mobile device 400 in this embodiment will not be limited to the structure as illustrated, but can include more or less components or some of the components can be combined or different components can be arranged, where:

The radio frequency circuit can be configured to receive and transmit a signal in receiving and transmitting information or in communication, and particularly to receive and then pass downlink information of a base station to the one or more processors for processing; and to send uplink data to the base station. Typically the radio frequency circuit includes but will not be limited to an antenna, at least one amplifier, a tuner, one or more oscillators, a Subscriber Identifier Module (SIM) card, a transducer, a coupler, a Low Noise Amplifier (LNA), a duplexer, etc. Moreover the radio frequency circuit can further communicate wirelessly with a network and another device in any one of communication standards or protocols including but not limited to a Global System of Mobile communication (GSM), a General Packet Radio Service (GPRS), a Code Division Multiple Access (CDMA), a Wideband Code Division Multiple Access (WCDMA), a Long Term Evolution (LTE), an e-mail, a Short Messaging Service (SMS), etc.

The memory 301 can be configured to store software programs and modules, and the processor 302 is configured to run the software programs and modules stored in the memory 301 to thereby perform various function applications and data processing. The memory can generally include a program storage area and a data storage area, where an operating system, applications required for at least one function (e.g., an audio playing function, an image playing function, etc.), etc., can be stored in the program storage area; and data created for use of the mobile device 400 (e.g., audio data, an address book, etc.), etc., can be stored in the data storage area. Moreover the memory 301 can include a high-speed random access memory, and can further include a nonvolatile memory, e.g., at least one magnetic disks memory device, a flash memory device or another volatile solid memory device. Correspondingly the memory 301 can further include a memory controller configured to provide an access of the processor 302 and the input device to the memory 301.

The input device can be configured to receive input digital or character information and to generate a keyboard, mouse, joystick, optical or track ball signal input related to user setting and function control. The input device can include a touch sensitive surface and another input device. The touch sensitive surface, also referred to as a touch display screen or a touch control panel, can collect a touch operation by a user thereon or in proximity thereto (e.g., an operation by the user using a finger, a touch pen or any other appropriate object or attachment on or in proximity to the touch sensitive surface) and drive a corresponding connected device by a preset program. Optionally the touch sensitive surface can include two components of a touch detection device and a touch controller, where the touch detection device detects the position of touching by the user, and detects a signal as a result of the touch operation and transfers the signal to the touch controller; and the touch controller receives the touch signal from the touch detection device, and converts it into coordinates of a touch point and further transfers them to the processor, and can receive and execute a command sent by the processor. Moreover the touch sensitive surface can be embodied in various types of resistive, capacitive, infrared, surface sound wave and other types. The input device can further include another input device in addition to the touch sensitive surface. Particularly the other input device can include but will not be limited to one or more of a physical keyboard, functional keys (e.g., volume control buttons, a power button, etc.), a track ball, a mouse, a joystick, etc.

The display device can be configured to display information entered by the user or information provided to the user and various graphic user interfaces of the mobile device 400, where these graphic user interfaces can be composed of graphics, texts, icons, videos or any combination thereof. The display device can include a display panel, and optionally the display panel can be configured in the form of a Liquid Crystal Display (LCD), an Organic Light-Emitting Diode (OLED) display, etc. Furthermore the touch sensitive surface can overlie the display panel, and after detecting the touch operation thereon or in proximity thereto, the touch sensitive surface transfers it to the processor to determine the type of the touch event, and thereafter the processor provides a corresponding visual output on the display panel according to the type of the touch event. Although the touch sensitive surface and the display panel are embodied in this embodiment as two separate components to perform the input and output functions, the touch sensitive surface and the display panel can be integrated to perform the input and output functions in some embodiments.

The mobile device 400 can further include at least one sensor, e.g., an optical sensor, a motion sensor and other sensors. The optical sensor can include an ambient optical sensor and a proximity sensor, where the ambient optical sensor can adjust the brightness of the display panel according to the illumination of ambient light rays, and the proximity sensor can disable the display panel and/or a backlight when the mobile device 400 moves in proximity to an ear. A gravity acceleration sensor which is a motion sensor can detect the magnitudes of accelerations in respective directions (typically three axes), and can detect the magnitude and the direction of gravity when the sensor is stationary and can be configured to perform applications of identifying the posture of a cell phone (e.g., switching between landscape and portrait modes, relevant games, calibration of the posture of a magnetometer, etc.), a relevant function of identifying vibration (e.g., a pedometer, a knock, etc.), etc.; and the mobile device 400 can be further configured with a gyroscope, a barometer, a hygrometer, a thermometer, an infrared sensor and other sensors, and a repeated description of these components will be omitted here.

The audio circuit, a speaker and a microphone can provide an audio interface between the user and the mobile device 400. The audio circuit can receive and convert audio data into an electric signal and transmit the electric signal to the speaker, which is converted by the speaker into an audio signal for output; and on the other hand, the microphone converts a collected audio signal into an electric signal which is received by the audio circuit and then converted into audio data, and the audio data is further output to the processor for processing and then transmitted by the radio frequency circuit to another device, for example, or the audio data is output to the memory for further processing. The audio circuit may further include an earphone jack for communication between an external earphone and the mobile device 400.

Wi-Fi belongs to short-distance wireless transmission, and the mobile device 400 can assist through the Wi-Fi module the user in transmitting and receiving an email, browsing a webpage, accessing stream media, etc., to thereby provide the user with a wireless and broadband access to the Internet.

The processor 302 is a control center of the mobile device 400, connects respective components through various interfaces and lines, and runs or executes the software programs and/or modules stored in the memory and invokes the data stored in the memory to perform the various functions of the mobile device 400 and process the data to thereby manage and control the mobile device 400 as a whole. Optionally the processor 302 can include one or more processing cores; and preferably the processor 302 can be integrated with an application processor and a modem processor, where the application processor generally handles the operating system, the user interfaces, the applications, etc., and the modem processor generally handles wireless communication. As can be appreciated, the modem processor may not be integrated into the processor.

The mobile device 400 further includes a power source (e.g., a battery) powering the respective components, and preferably the power source can be logically connected with the processor through a power management system to thereby perform charging and discharging management, power consumption management, and other functions through the power management system. The power source can further include one or more DC or AC power sources, recharging systems, power source failure detection circuits, power source transformers or inverters, power source status indicators, and other any appropriate components.

Although not illustrated, the mobile device 400 can further include a camera, a Bluetooth module, etc., and a repeated description thereof will be omitted here. In this embodiment, the memory 301 and the processor 302 can be further configured for the embodiment described above with reference to FIG. 3, and for details thereof, reference can be made to FIG. 3 and the related description thereof.

Since the embodiments of the apparatus are substantially similar to the embodiments of the method, the embodiments of the apparatus have been described in brief, and for details thereof, reference can be made to the description of the embodiments of the method.

The respective embodiments in the description have been described progressively, and each of the embodiments has been focused on its differences from the other embodiments, and the description of their commonalities can be applied to each other.

Those skilled in the art shall appreciate that the embodiments of the application can be embodied as a method, a system or a computer program product. Therefore the application can be embodied in the form of an all-hardware embodiment, an all-software embodiment or an embodiment of software and hardware in combination. Furthermore the application can be embodied in the form of a computer program product embodied in one or more computer useable storage mediums (including but not limited to a disk memory, a CD-ROM, an optical memory, etc.) in which computer useable program codes are contained.

The application has been described in a flow chart and/or a block diagram of the method, the device (system) and the computer program product according to the embodiments of the application. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

It shall be further noted that such relationship terms in this context as first and second, etc., are merely intended to distinguish one entity or operation from another entity or operation but not necessarily intended to require or suggest any such a real relationship or order between these entities or operations. Furthermore the terms "include", "comprise" and any variants thereof are intended to encompass nonexclusive inclusion so that a process, a method, an article or a device including a series of elements includes both those elements and one or more other elements which are not listed explicitly or one or more elements inherent to the process, the method, the article or the device. Unless stated otherwise, an element being defined in the sentence "include/comprise a(n) . . . " will not exclude the presence of one or more additional identical element in the process, the method, the article or the device including the element.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A mobile device comprising:
a memory configured to store at least one instruction; and
a processor configured to execute the instruction stored in the memory to:
if a Wi-Fi function of the mobile device is enabled, obtain a mobile country code of a country or region in which a subscriber identity module (SIM) card in the mobile device is registered and write the mobile country code into a specified file;
read the mobile country code from the specified file while a Wi-Fi driver of the mobile device is being loaded;
inquire from a list of channels about channel information corresponding to the mobile country code;
configure a Wi-Fi channel of the mobile device according to the channel information;
match the mobile country code against a preset country search table in which valid mobile country codes are recorded; and
if the mobile country code is matched successfully, determine the mobile country code as being valid, search for a category of the country or region to which the mobile country code belongs and extract the channel information corresponding to the category.

2. The mobile device according to claim 1, wherein the processor is further configured to execute the instruction stored in the memory to if the mobile country code is matched unsuccessfully, determine the mobile country code as being invalid and extract preset channel information.

3. The mobile device according to claim 1, wherein the categories comprise at least one of following categories:
a first category, a second category, and a third category;
wherein channels corresponding to the first category comprise channels 1 to 13,
channels corresponding to the second category comprise channels 1 to 11, and
channels corresponding to the third category comprise channels 1 to 14; and
preset channels comprise channel 1 to 11.

4. A method for configuring a Wi-Fi channel of a mobile device, the method comprising:
if a Wi-Fi function of the mobile device is enabled, obtaining a mobile country code of a country or region in which a SIM card in the mobile device is registered and writing the mobile country code into a specified file;
while a Wi-Fi driver of the mobile device is being loaded, reading from the specified file the mobile country code;
inquiring from a list of channels about channel information corresponding to the mobile country code;
configuring a Wi-Fi channel of the mobile device according to the channel information;
matching the mobile country code against a preset country search table in which valid mobile country codes are recorded; and
if the mobile country code is matched successfully, determining the mobile country code as being valid, searching for a category of the country or region to which the mobile country code belongs and extracting the channel information corresponding to the category.

5. The method according to claim 4, further comprising determining the mobile country code as being invalid and extracting preset channel information if the mobile country code is matched unsuccessfully.

6. The method according to claim 4, wherein the categories comprise at least one of following categories:
a first category, a second category, and a third category;
wherein channels corresponding to the first category comprise channels 1 to 13,
channels corresponding to the second category comprise channels 1 to 11, and
channels corresponding to the third category comprise channels 1 to 14; and
preset channels comprise channel 1 to 11.

* * * * *